Patented May 16, 1944

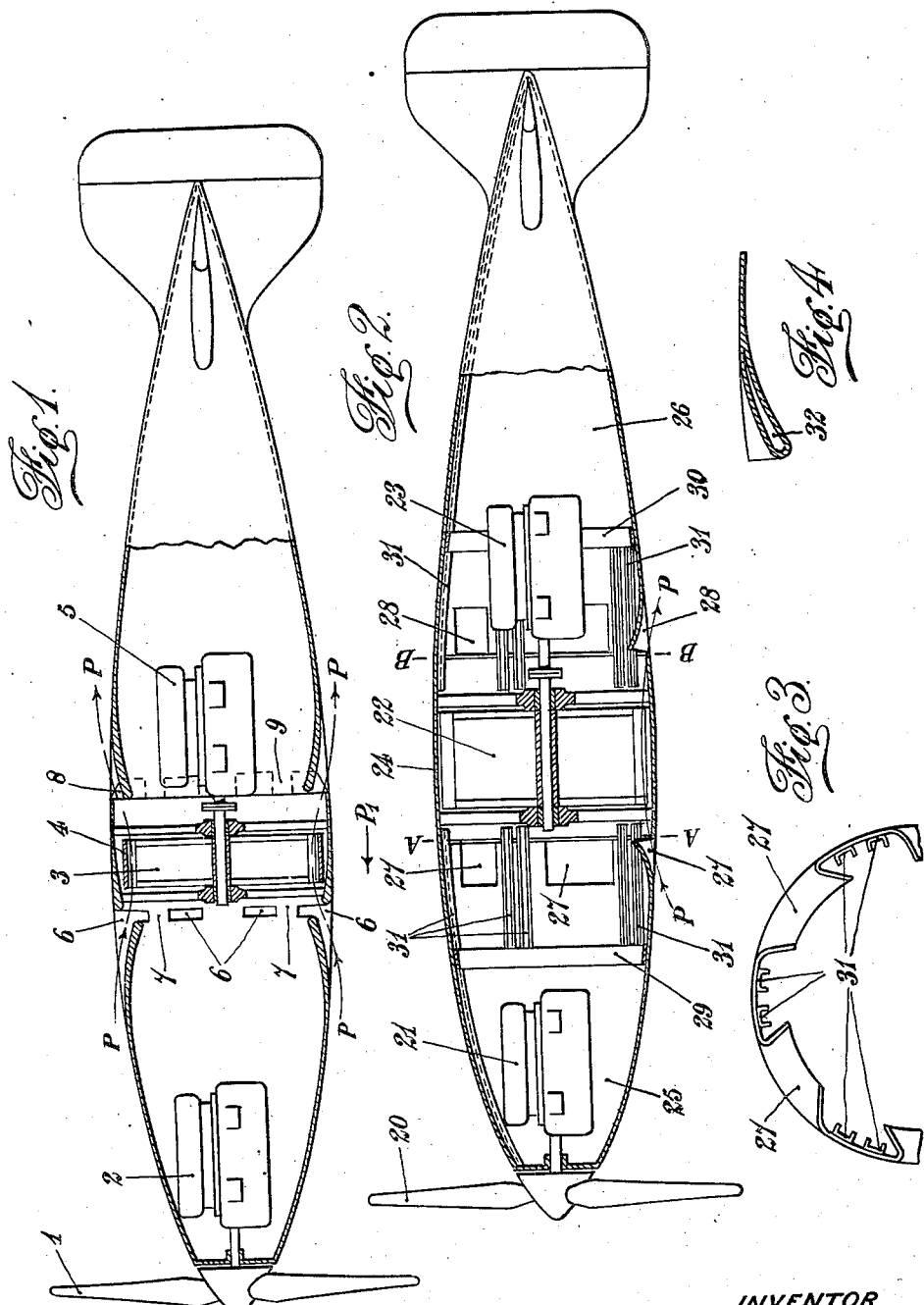

2,348,792

UNITED STATES PATENT OFFICE 2,348,792

PROPELLING PLANT FOR AIRCRAFT

Claude Dornier, Friedrichshafen, Lake of Constance, Germany; vested in the Alien Property Custodian Application August 22, 1938, Serial No. 226,191
In Germany August 17, 1937

7 Claims. (Cl. 244—62)

The present invention relates to aircraft in general and more particularly to propelling plant for high speed aircraft, that is to say to aircraft having a flying speed approximately near to the velocity of sound.

With flying speeds as commonly known and attained today, which as a rule rarely exceed 150 meters per second, it is necessary, in order to attain sufficiently good efficiency, to choose proportionately small air screw circle loads. It is possible, whilst maintaining the same degree of efficiency, to increase the loading of the air screw circle in proportion to an increase of the velocity. With aircraft, the flying speed of which approximates the velocity of sound, it thus becomes possible to increase the loading of the air screw circle very considerably, without lowering the efficiency. Consequently, it is also possible, to give the air screw a diameter, which permits of all the several units of the driving plant including the air screw being arranged within the fuselage or the nacelle. Within the fuselage or nacelle envelope having an aerodynamically favourable shape, that is to say a spindle shape, which may be the shape of either the fuselage or the motor nacelle, there is mounted a motor-driven blower or fan, which rotates coaxially with the longitudinal axis of the envelope, and which draws in air through slot openings provided in front thereof and expels the air through slot openings provided at the rear thereof. Similar arrangements, where however the blower or fan does not rotate around the longitudinal axis of the envelope, or where no spindle shaped envelope is present, are known per se. Should however an aircraft be built according to the known designs, it would not be able to start. A favourable degree of efficiency of the blower or fan arranged in the interior of the envelope with the air supply effected through slot-openings provided in the envelope, is however only then attained when the aircraft flies at a great speed, but not as long as the speed is but small or zero. For this reason an aircraft propelling plant according to the present invention is intended to comprise a traction screw or propeller mounted at the nose of the fuselage or of the motor nacelle, and a blower or fan mounted in the interior of the envelope.

The blower or fan may be inserted together with its separate housing into the envelope. The design may however also be such, that the blower or fan housing forms a middle section of the envelope, to which the fore part of the envelope is suitably connected at its front and the rear part of the envelope at its rear. The joints will generally be so located, that they coincide with the circles of the slot openings. The three parts are then connected by means of bridge members or webs provided between the openings. Such a design offers no difficulties to the designer, as the envelope, that is to say, the fuselage or the nacelle, is in most cases provided with an interior frame, comprising bulkheads and longitudinal sections, which can be utilised also as a means of connecting the parts together. It is also possible to locate the air openings provided in the middle part, which forms the housing for the blower or fan, and the middle part may in this case be suitably cast of a light metal.

The bridges or webs between the air slot openings are preferably so designed as to serve also as guiding devices for the air, in order to keep the air flow losses as low as possible at these points. As these bridges or webs must, in order to be strong enough, be hollow, they can be used for the circulation of the motor cooling water, thus forming a kind of radiator for the motor cooling water.

In order that the invention may be clearly understood and readily carried into effect reference is made to the accompanying drawing which shows diagrammatically and by way of example constructions of aircraft propelling plant in accordance with the present invention.

Figure 1 is a longitudinal section of an aircraft having propelling plant in accordance with the present invention.

Figure 2 is a longitudinal section of an aircraft having a modified form of propelling plant also in accordance with the present invention.

Figures 3 and 4 are detail views hereinafter described.

Referring to Figure 1 of the drawing a traction screw 1 is mounted at the nose of the aircraft which is formed with a spindle shaped fuselage said traction screw being driven by a motor 2. A tail unit is mounted in the usual manner at the tail of the fuselage. A blower or fan 3 is mounted within the fuselage approximately at the point of its largest diameter, the blower or fan being enclosed in a suitable housing 4. The axis of rotation of the blower or fan coincides with the longitudinal axis of the spindle shaped fuselage. The blower or fan 3 is driven by a motor 5. At 6 air inlet slot openings are provided in the fuselage, which openings alternate with bridges or webs 7. Air outlet slot openings are provided at 8 behind the blower or fan 3, having bridges or webs 9 provided between them.

The bridges or webs 9 are shown in Figure 1 in dotted lines. The air set in motion by means of the blower or fan 3 follows a path indicated by arrows P.

In Figure 2 a traction screw 20 is suitably mounted at the front end of the fuselage the said screw 20 being driven by a motor 21. At the tail end of the fuselage a tail unit is mounted in the usual manner. A blower or fan 22, which is driven by a motor 23, is arranged at the place where the fuselage has the largest diameter. The difference in comparison with the arrangement according to that shown in Figure 1 lies in the fact that the fan or blower housing 24 forms at the same time a part of the envelope, or fuselage covering. The fan or blower housing 24 thus forms the middle part of the fuselage, which extends from the separating plane A to the separating plane B. A fore end unit 25 of the fuselage and a fuselage rear unit 26 are joined to the middle fuselage unit at those planes.

The fore part 25 of the fuselage is provided with air inlet openings as indicated at 27 and in a similar manner the fuselage rear part is provided at 28 with air outlet openings. The fore part 25 and the rear part 26 of the fuselage are provided with bulkheads 29 and 30 and with longitudinal stiffening members 31, which protrude beyond the end planes of the fuselage fore and rear parts and which serve as a means of connecting them to the fuselage middle part 24.

The path followed by the air current is indicated in Figure 2 by the arrows P.

Figure 3 drawn to an enlarged scale shows the end plates of the fore part 25 of the fuselage as seen in the direction of the arrow P₁. The air inlet openings 27 are clearly shown and the walls thereof which form the intervening webs or bridges are so shaped, as to act as guides for the air. Channel sections 31 are arranged between the air openings as clearly shown in Figure 3.

Figure 4 shows a longitudinal section through an air inlet or outlet opening. It will be observed from Figure 4 that the wall of the air guide is hollow at 32, so that the cooling water can circulate through it.

What I claim is:

1. Propelling plant for aircraft comprising in combination, a fuselage having a spindle shape, a tractor airscrew at the nose thereof, means disposed in the interior of the said fuselage and adapted to drive the said air screw, a blower or fan disposed intermediate the ends of and wholly within the said fuselage, means in the said fuselage to permit of the flow of air to and from the said blower or fan in substantially the plane of the skin of the fuselage and means in the interior of the fuselage to rotate the blower or fan the axis of the latter being co-axially arranged with the longitudinal axis of the fuselage.

2. Propelling plant for aircraft comprising in combination, a spindle shaped fuselage, a tractor air screw, mounted at the nose and externally thereof, motor driving means disposed in the interior of the fuselage and coupled to the said tractor air screw, a blower or fan mounted in the interior of the fuselage and co-axially arranged therewith, openings in the fuselage in front and rear of the blower or fan to permit of the flow of air solely under the influence of the blower or fan and means to rotate the latter.

3. Propelling plant for aircraft comprising a multiunit spindle shaped fuselage, a tractor screw mounted at the nose of one part, a driving motor in the said part coupled to the tractor screw, a blower or fan housing connected to the said part, a rear part, driving means in the latter part, means connecting the rear part to the blower or fan housing, means to admit air to the blower or fan and means to permit of the escape of air from the said blower or fan.

4. An aircraft comprising a plurality of driving motors spaced apart and co-axially arranged with the longitudinal axis of the aircraft fuselage, a tractor screw adapted to be rotated by one driving motor, air inducing and expelling means disposed between the driving motors, and openings in the aircraft fuselage to permit of a flow of air to the said air inducing and expelling means and the escape of air therefrom.

5. An aircraft comprising a plurality of driving motors spaced apart and co-axially arranged with the longitudinal axis of a spindle shaped fuselage, a tractor screw mounted at the nose of the fuselage and externally thereof, air inducing and expelling means in the interior of the fuselage, a driving motor therefor, air inlet openings in the fuselage, air outlet openngs in the said fuselage, bridges or webs disposed between the air inlet and air outlet openings and means to drive the said air inducing and expelling means.

6. An aircraft comprising a spindle shaped fuselage, a tractor screw rotatably mounted at the nose thereof, a driving motor therefor disposed in the interior of the fuselage, a rear motor, air inducing and expelling means disposed between the said motors and in the interior of the fuselage, air inlet and outlet openings in the fuselage and means disposed between the air inlets and the air outlets to act as cooling means for the motor cooling water.

7. An aircraft comprising a spindle shaped fuselage, a tractor screw rotatably mounted at the nose thereof, a driving motor therefor disposed in the interior of the fuselage, a rear motor, air inducing and expelling means disposed between the said motors and in the interior of the fuselage, air inlet and air outlet openings in the fuselage, hollow bridges or webs disposed between the air inlets and means to allow of the motor cooling water flowing therethrough to effect cooling of the said water.

CLAUDE DORNIER.